US009571404B2

(12) United States Patent
Howes et al.

(10) Patent No.: US 9,571,404 B2
(45) Date of Patent: Feb. 14, 2017

(54) METHOD AND SYSTEM FOR PRIORITIZING NETWORK PACKETS

(71) Applicant: Aruba Networks, Inc., Sunnyvale, CA (US)

(72) Inventors: Richard A. Howes, Santa Monica, CA (US); William M. LeBlanc, Atlanta, GA (US)

(73) Assignee: Aruba Networks, Inc., Sunnyvale, CA (US)

( * ) Notice: Subject to any disclaimer, the term of this patent is extended or adjusted under 35 U.S.C. 154(b) by 51 days.

(21) Appl. No.: 14/169,026

(22) Filed: Jan. 30, 2014

(65) Prior Publication Data

US 2014/0146676 A1 May 29, 2014

Related U.S. Application Data

(63) Continuation-in-part of application No. 14/069,360, filed on Oct. 31, 2013.

(60) Provisional application No. 61/724,794, filed on Nov. 9, 2012.

(51) Int. Cl.
*H04L 12/851* (2013.01)
(52) U.S. Cl.
CPC ................................. *H04L 47/2441* (2013.01)
(58) Field of Classification Search
CPC ................. H04L 47/2441; H04L 47/24; H04L 2012/5651; H04L 2012/5652
USPC ......... 370/229, 235, 351, 389, 395.1, 395.4, 370/395.42, 464, 465, 473, 474, 480, 485, 370/486, 487
See application file for complete search history.

(56) References Cited

U.S. PATENT DOCUMENTS

| | | | |
|---|---|---|---|
| 7,518,524 B1 | 4/2009 | Aiello et al. | |
| 8,363,548 B1* | 1/2013 | Aboul-Magd et al. | ........ 370/235 |
| 2004/0120345 A1* | 6/2004 | Yamaguchi et al. | .......... 370/465 |
| 2004/0131013 A1* | 7/2004 | Ise et al. | ....................... 370/229 |
| 2005/0018607 A1* | 1/2005 | Frouin | .......................... 370/230 |
| 2006/0187840 A1 | 8/2006 | Cuffaro et al. | |
| 2006/0209807 A1 | 9/2006 | Lor et al. | |
| 2007/0025264 A1 | 2/2007 | Cheng et al. | |
| 2008/0025318 A1* | 1/2008 | Knazik | ............... H04L 47/2475 370/395.21 |
| 2008/0123660 A1 | 5/2008 | Sammour et al. | |
| 2013/0239150 A1* | 9/2013 | Chen et al. | ..................... 725/62 |

* cited by examiner

*Primary Examiner* — Obaidul Huq
(74) *Attorney, Agent, or Firm* — Brooks, Cameron & Huebsch, PLLC (57) ABSTRACT

According to one embodiment, a system is described that comprises a network device adapted to receive a media stream including a plurality of network packets. The network device of the system processes the media stream, targeted for a client device communicatively coupled to the network device, by performing a number of operations. A first operation comprises partitioning the plurality of network packets into a plurality of subsets, each subset in the plurality of subsets corresponding to a media frame in a plurality of frames. Next, a priority level is determined for each media frame in the plurality of media frames, where the priority level for each media frame is assigned to each of the one or more network packets in the frame. Thereafter, network packets are transmitted or dropped based at least on the priority level associated with each network packet in the plurality of network packets.

19 Claims, 7 Drawing Sheets

METHOD AND SYSTEM FOR PRIORITIZING NETWORK PACKETS

CROSS-REFERENCE TO RELATED APPLICATIONS

This application claims the benefit of priority on U.S. patent application Ser. No. 14/069,360 filed Oct. 31, 2013, which is based upon and claims priority on U.S. Provisional Application No. 61/724,794, filed on Nov. 9, 2012, the entire content of both of which are incorporated by reference herein.

FIELD

Embodiments of the disclosure relate to the field of communications, and in particular, to a system, network device and method directed to determining priority levels for network packets and transmitting or dropping each network packet based at least on its priority level.

GENERAL BACKGROUND

Real-time Transport Protocol (RTP) defines a standardized packet format for delivering streaming media, such as audio and video streams, over Internet Protocol (IP) networks. RTP is used in conjunction with the RTP Control Protocol (RTCP), where RTP handles the media streams (e.g., audio and video) while RTCP handles quality of service (QoS) monitoring as well as the synchronization of multiple media streams.

However, RTP, RTCP and other conventional real-time network protocols are incapable of determining and assigning priority level and/or prioritizing network packets on a per-packet basis. In other words, priority in the form of quality of service (QOS) does not have sufficient granularity to prioritize on a packet importance basis. Rather, priority is applied to an entire communication session or to streams within the session without an ability to define the inter-relationships (dependency, redundancy) of the packets and streams that define relative priorities.

BRIEF DESCRIPTION OF THE DRAWINGS

The following description and accompanying drawings are used to illustrate embodiments of the disclosure.

DETAILED DESCRIPTION

As described herein, a first embodiment of the disclosure is directed to a system, network device and method for determining and assigning priority levels to network packets associated with one or more media frames of a presentation (e.g., multimedia stream including one or more streams of media such as video, audio, and/or forward error correction "FEC"). Herein, a "network device" may be an access point (AP) or other electronics configured to determine and assign priority levels to each network packet prior to passing the prioritized network packets to the AP. Also, a "media frame" is different than a single L2 frame, but rather, it is a logical substructure of a media stream and comprises data from the application layer (OSI layer 7) payload.

This priority determination scheme may be based on a number of parameters that are inherent to the particular encoding scheme used for transmission of network packets within a presentation, including (1) the type of media frame to which the network packet belongs; (2) ordering of the network packet within the media frame or the ordering the corresponding media frame within a media stream; and/or (3) relationship (dependency or redundancy) between the network packet and other network packets within the media stream, between the media frame to which the network packet belongs and other media frames within a common media stream, and/or between the media stream to which the media frame belongs and other media streams within a common presentation.

Additionally, in accordance with another aspect of the first embodiment, independent of being adapted to determine and assign the priority level for processing packets within incoming media frames, the network device may be configured to control packet transmissions. Such controls may involve transmitting or dropping particular network packet(s) based at least on the priority level assigned to that particular network packet(s). Of course, while the decision as to which network packet(s) to transmit or drop may be based on the priority level(s) of the network packet(s), it is contemplated that real-time analysis of network conditions (e.g., network load, error rate, amount of allocated time remaining for transmission, etc.) and state information (e.g., client device association, bandwidth constraints due to bandwidth contracts held by the associated client devices, power levels of associated client devices, transmit rates in communications with the associated client device(s), etc.) is the impetus for determining by the network device that some network packets queued for transmission may not be transmitted within the maximum airtime allocated. In other words, the decision to transmit/drop packets is conducted by a device closest to the end user (e.g. access point, base station, etc.) and based on metadata (hierarchy of relationships, timing, ordering and/or bandwidth) about the presentation.

Lastly, in accordance with a second embodiment of the disclosure, the network device may be configured to dynamically modify one or more transmission (TX) parameters based on (i) the classification associated with the particular packet (e.g., priority level) and (ii) one or more network conditions (e.g., network load, error rate, amount of allocated time remaining for transmission, etc.). These TX parameters are parameters used by the network device to control transmission of network packets therefrom. Examples of types of TX parameters may include a data transmission rate, inter-frame spacing, a number of retries, coding scheme, and/or transmit power level.

More specifically, within a presentation, different media frames may have different levels of importance. As described herein, hierarchical priority relationships exist between groups of network packets which may be part of one or more media frames. In order to avoid out-of-order packet processing, a set of ordered queues may be organized on a "per presentation" as shown below, although the queues may be organized on a "per client device" or even a "per user" basis for example.

Each queue may be a construct, perhaps a virtual construct, which imposes ordering, timing and relationship constraints for data stored therein. While each queue is used to specify transmit ordering for its stored data and is originally set to the same priority, the queues may have different "realized" priorities based at least in part on network conditions that influence the amount of airtime available for a given time period. As an illustrative example, a first (base) queue may be originally assigned a prescribed priority but is modified to have the highest priority as it is adapted based on real-time network state to process incoming audio network packets and certain video network packets associated with an audio-video (A/V) presentation. A second (dependent) queue is assigned the prescribed priority but is modified to have a lower priority than the base queue when adapted to process network packets that rely on other network packets, such as network packets associated with resolution enhancement layer of base layer video stored in the first queue.

Additionally, or in the alternative, a third (redundant) queue may be assigned a priority less than the first and second queues unless a feedback event indicates that the network packets to which the network packets in the redundant queue pertain were not successfully transmitted. Hence, the priority assigned to the third queue may be increased perhaps higher than the first queue. The priority of the queues that are configured to support the transmission of network packets associated with the presentation may be modified in real-time based on current network conditions and state information.

It is noted that, while queues associated with a presentation may feature different priorities based on their relationships to other queues, each of the network packets within these queues is assigned a priority level based at least in part on the priority level associated with the corresponding media frame (e.g., an I-frame may be assigned a first priority while a P-frame may be assigned a second priority less than the first priority due to its dependency on the I-frame). As a result, it is contemplated that the "realized" priority level for network packets stored within a particular queue may change (e.g., increase or decrease) as the priority level associated with that queue changes (e.g., increases or decreases).

According to the below described packet-based prioritization scheme, the priority of network packets directed to high Open Systems Interconnection (OSI) layer components (e.g., an Application layer such as OSI Layer 7) may be significantly influenced by lower OSI layer feedback information such as L1/L2 information received via Physical or Data Link Layers such as OSI Layers 1 and 2 for example. Hence, L1/L2 feedback information is used to adjust operations at the Application (L7) layer.

I. Terminology

Herein, certain terminology is used to describe features of the disclosure. For example, the term "network device" generally represents electronics that support the receipt and/or transmission of wireless and/or wired communications including, but not limited or restricted to a controller; an access point (AP); a base station; a data transfer device (e.g., switch, router, bridge, etc.); consumer electronics with wireless connectivity such as a television, a set-top box, a digital video recorder (DVR), a video gaming console, a projector, cellular phone supporting wireless (non-cellular) connectivity; or the like.

It is contemplated that the network device may include logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory (computer-readable) storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" and "component" are generally defined as hardware and/or software. For example, as hardware, logic may include processing circuitry (e.g., a microcontroller, any type of processor, a programmable gate array, an application specific integrated circuit, etc.), semiconductor memory, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals).

An "interconnect" is generally defined as a physical or logical communication pathway. This pathway may be established over an information-carrying medium, which may be a physical medium (e.g., electrical wire, optical fiber, cable, bus traces, etc.), a wireless medium (e.g., air in combination with wireless signaling technology) or a combination thereof. The data transferred over the interconnect may be in accordance with a variety of communication protocols including, but not limited or restricted to those protocols in accordance with WIFi™, various IEEE 802.11 standards (e.g., IEEE 802.11ac, 802.11n, etc.), or the like.

Each of the terms "media frame" and/or "network packet" denote a different grouping of media (e.g., video, audio, forward error correction "FEC", video enhancement data, etc.), namely a series of bits having a prescribed format. Herein, a media frame may include one or more network packets. Herein, one type of media frame may be an "I-frame" (Intra-coded frame), which is an intra-coded, independent video frame. In general, the I-frame is defined as a fully specified media frame that can be decoded without knowledge or receipt of other encoded video frames, and may be used as a reference frame by B-frames, P-frames, and other types of frames. Of course, an "IDR" is an I-frame that indicates by its presence that no following frames will reference frames that preceded the I-frame in transmission order. It serves as a random access point in the stream.

B-frames and P-frames are used by a media source in an attempt to limit the amount of redundant information transmitted. For example, in a scene where an airplane flies across a horizon in the background, only the airplane's movements need to be encoded. The media source does not need to transmit unchanged pixels, thus saving space. A "P-frame" (predictive frame) can refer to reference frames from previous sampled times, and can also serve as a reference frame. A "B-frame" (bi-predictive frame) can refer to reference frames from both previous and future sampled times, but cannot serve as a reference frame. The B-frame may rely on multiple reference frames that precede or follow the P-frame in presentation order.

The terms "dependent" (dependency) and "redundant" (redundancy) generally mean a particular relationship between two groupings of media packets. For instance, a first grouping of media (e.g., first packet) is considered "dependent" on a second grouping of media (e.g., second packet) when the first packet cannot be decoded without prior decoding of the second packet. Also, a first grouping of media (e.g., first packet) is considered "redundant" with a second grouping of media (e.g., FEC data, a second packet having identical payloads, etc.).

Lastly, the terms "or" and "and/or" as used herein are to be interpreted as inclusive or meaning any one or any combination. Therefore, "X, Y or Z" or "X, Y and/or Z" mean "any of the following: X; Y; Z; X and Y; X and Z; Y and Z; X, Y and Z." An exception to this definition will occur only when a combination of elements, functions, steps or acts are in some way inherently mutually exclusive.

Certain details are set forth below in order to provide a thorough understanding of various embodiments of the disclosure, albeit the invention may be practiced through many embodiments other that those illustrated. Well-known logic and operations are not set forth in detail in order to avoid unnecessarily obscuring this description.

II. Network Architecture

Figure 1:
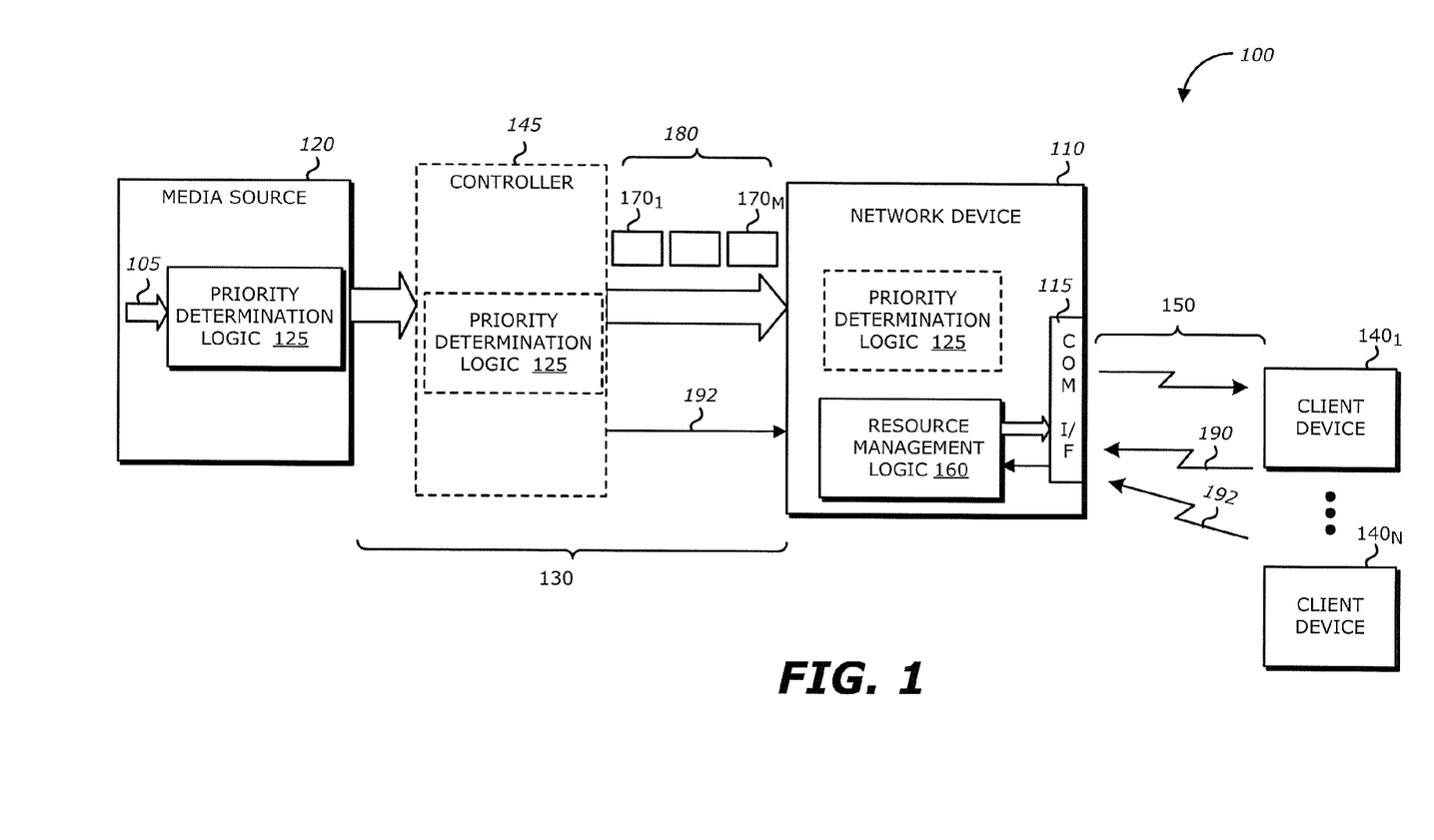
FIG. 1 is an illustrative embodiment of a network that includes one or more network devices implemented with priority determination logic for determining and assigning priority levels to network packets associated with one or more media frames and/or resource management logic for dynamically modifying one or more transmission (TX) parameters.

Referring to FIG. 1, an illustrative embodiment of a network 100 that includes one or more network devices implemented with priority determination logic 125 and/or resource management logic 160 is shown. The priority determination logic 125 is logic that is configured to determine and assign priority levels to network packets associated with media streams undergoing wireless transmission. The resource management logic 160 is logic that is configured to (i) transmit or drop a network packet based at least on its priority level, and/or (ii) dynamically adjust transmission parameters based on packet priority and network conditions.

Herein, as shown in FIG. 1, network 100 comprises a network device 110 that is adapted to receive a sequence of network packets associated with presentation 105 (e.g., multimedia stream including one or more (encoded) media streams of video, audio, FEC, or other types of media) that is routed from a media source 120 over a first communication path 130. According to one embodiment of the disclosure, although not shown, the media source 120 comprises priority determination logic 125 that encodes media received as input (e.g. from a media storage device) and outputs the encoded media (e.g., to a media server) as one or more encoded media streams representing presentation 105 (e.g., one or more video streams and/or audio streams). Thereafter, the network device 110 is configured to transmit some or all of the network packets from the incoming media streams to other network device(s), such as client devices $140_1$-$140_N$ (where $N \geq 1$) over a second communication path 150.

According to one embodiment of the disclosure, the priority determination logic 125 within the media source 120 is configured to categorize network packets within one or more media streams of the presentation 105 by determining and assigning priority levels for these network packets. Furthermore, the priority determination logic 125 may assign a priority level to the presentation 105 along with priority levels for each media stream of the presentation 105.

A. Network Packet Prioritization

Figure 2:
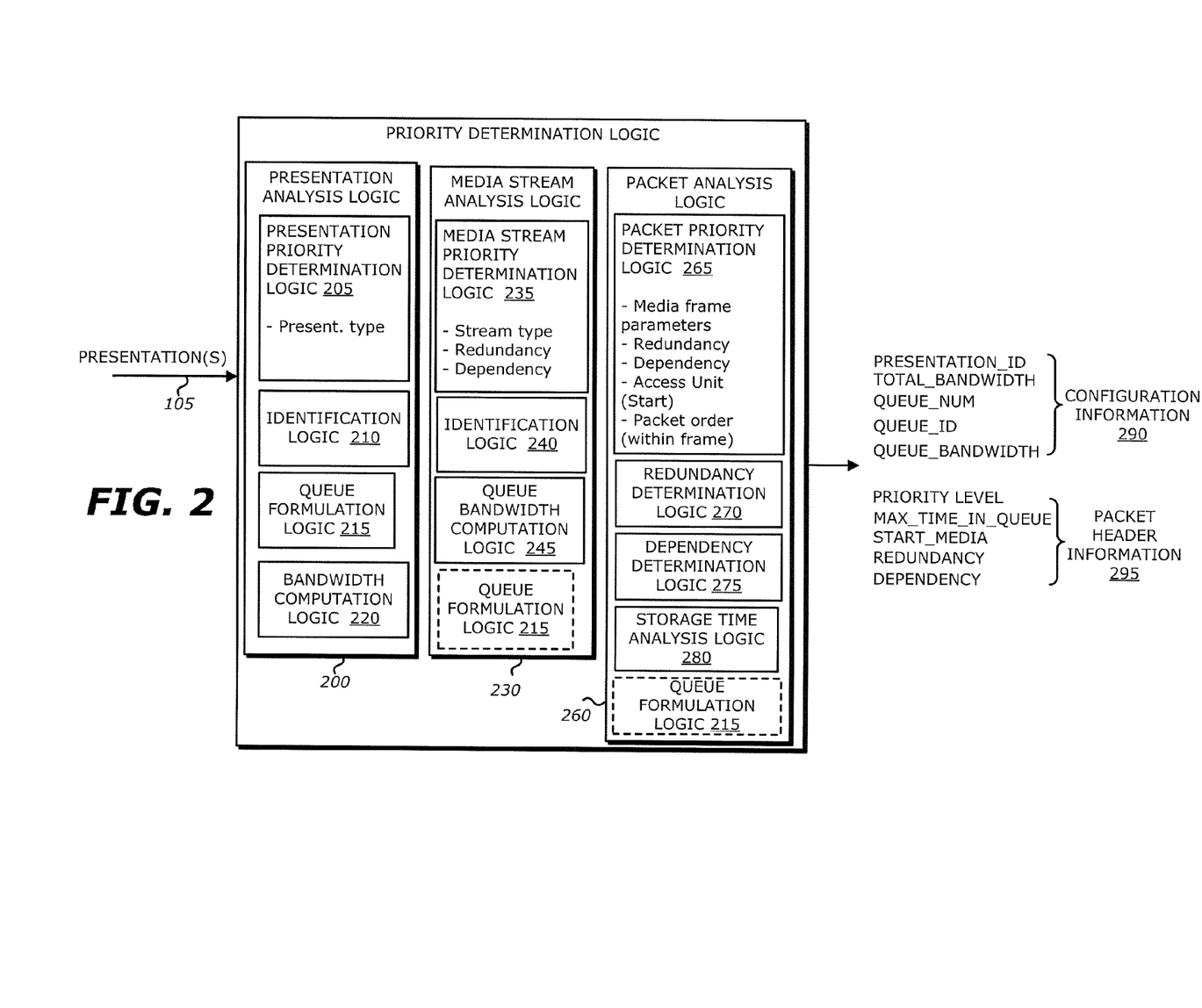
FIG. 2 is an exemplary embodiment of the priority determination logic of FIG. 1.

Referring to FIG. 2, an exemplary embodiment of the priority determination logic 125 is shown. Herein, priority determination logic 125 is responsible for determining and assigning priority levels to the presentation 105, each media stream forming the presentation 105, and each network packet forming each media stream. Such prioritization may be conducted by presentation analysis logic 200, media analysis logic 230 and packet analysis logic 260, as shown.

As described for illustrative purposes, the priority level for network packets may be initially determined based on a priority associated with a media frame, which is a subset of network packets within a media stream. The priority level for network packets awaiting transmission from the network device 110 of FIG. 1 may be assigned and subsequently altered based on whether certain transmitted packets have successfully reached a target network device, and/or based on a time or time period associated with this particular subset of network packets (e.g., time period during which the media frames are still relevant).

Referring to both FIGS. 1 and 2, presentation analysis logic 200 comprises presentation priority determination logic 205, identification logic 210, queue formulation logic 215, and/or bandwidth computation logic 220. Herein, presentation analysis logic 200 receives one or more incoming presentations 105 destined for one or more client devices $140_1$-$140_N$, where the identification logic 210 assigns a unique identifier (Presentation_ID) to each incoming presentation 105. The Presentation_ID may be used to identify that a media stream received by the network device 110 for wireless transmission is part of a particular presentation.

Additionally, the presentation priority determination logic 205 analyzes the content within a presentation in order to determine its priority. Such analysis may involve determining the collection of streams, and their associated individual characteristics, that make up the network data of the presentation (e.g., audio-video, audio, video, etc.).

For instance, as an illustrative example, a plurality of presentations are provided as input to presentation priority determination logic 205, which determines that a first presentation is an interactive audio-video (AV) presentation including one or more audio streams along with base layer video. As a result, based on the presence of one or more audio streams along with base layer video, presentation priority determination logic 205 may assign a first priority level to the first presentation. In contrast, where the second presentation comprises media streams that are non-interactive and less latency sensitive (for example a broadcast video), the presentation priority determination logic 205 may assign a second priority level lower than first priority level.

In addition to presentation priority determination logic 205, it is contemplated that presentation analysis logic 200 may further comprise queue formulation logic 215 that determines, based on the media streams forming the presentation and their relationships to each other, the queue organization (e.g., number of queues "Queue_Num", etc.) needed to support prioritized network packet transmissions. As represented by dashed boxes, it is contemplated that the queue formulation logic 215 may also be optionally deployed within media stream analysis logic 230 and/or packet analysis logic 260 as continued processing of the content within the presentation may detect the need for additional queues and provide additional information concerning the inter-relationships for these queues.

Bandwidth computation logic 220 is configured to compute the total amount of bandwidth (Total_Bandwidth) needed to transmit all of the network packets forming the presentation. Total bandwidth may be determined through a variety of mechanisms, including out-of-band analysis. Similar in operation to presentation analysis logic 200, media stream analysis logic 230 comprises media stream priority determination logic 235, identification logic 240, queue bandwidth computation logic 245, and/or an optional queue formulation logic 215. Herein, media stream analysis logic 230 receives one or more media streams associated with the incoming presentation, where the identification logic 240 assigns a unique identifier (Queue_ID) for each media stream. The Queue_ID may be used to identify that a particular network packet received by the network device 110 for wireless transmission is part of a particular media stream and further identify a particular queue to which the network packets may be forwarded.

Based on the size of the media stream or via out-of-band metadata, the bandwidth necessary to deliver all of the data associated with the queue successfully (Queue_Bandwidth) can be determined by the queue bandwidth computation logic 245.

Additionally, the media stream priority determination logic 235 may analyze the content within a media stream in order to determine its priority. Such analysis may involve determining the type of media (e.g., audio, video, FEC, etc.). Further factors for analysis may include (1) whether the media stream is "dependent" on any other media stream and/or (2) whether the media stream is "redundant" with any other media stream. Such relationships may cause the media stream to be initially assigned a lower priority than the media stream to which it is dependent and/or redundant.

For instance, as an illustrative example, a first media stream associated with the presentation 105 may include base layer video, which may warrant the first media stream to be assigned a first priority level. In contrast, where a second media stream associated with the presentation 105 comprises a resolution enhancement layer video that is dependent on the base layer video, the second media stream may be assigned a priority lower than first priority level Referring still to FIGS. 1 and 2, packet analysis logic 260 comprises packet priority determination logic 265, redundancy determination logic 270, dependency determination logic 275, storage time analysis logic 280, and/or optional queue formulation logic 215.

According to one embodiment of the disclosure, operating in combination with redundancy determination logic 270 and dependency determination logic 275, the packet priority determination logic 265 may be configured to determine priority for network packets within a media stream by partitioning a plurality of network packets of the media stream into a plurality of subsets, where each subset in the plurality of subsets may correspond to a media frame and its associated type (e.g., I-frame, P-frame, B-frame, audio access unit, etc.).

It is noted that packet analysis logic 260 may also identify the first network packet associated with the media frame and subsequently identify this packet by including a Start_Media tag within its header. Hence, if there are any network packets with the media frame that are to be dropped, (e.g. in order to conserve airtime and perhaps improve overall system performance, perform frame rate reduction, etc.), the network device may drop all of the network packets associated with the media frame until the next Start_Media tag in lieu of dropping only a portion of its network packets.

After partitioning the plurality of network packets, the packet priority determination logic 265 may be configured to initially determine a priority level for each particular media frame based at least on one or more media frame parameters such as media frame type, frame location within the media stream (e.g., a distance of the particular media frame from a neighboring I-frame); redundancy on another media frame; and/or dependency on another media frame. It is noted that redundancy and dependency may be determined by redundancy determination logic 270 and dependency determination logic 275 based at least on the analysis of the media frame type—type of media (e.g., video, audio, etc.) associated with the media frame as well as the type of frame (based on the particular coding scheme used). The redundancy and dependency may be further identified within a designated field of the network packet header, as shown below for illustrative purposes only as any selected format may be used.

| Field: | Description |
| --- | --- |
| 0001b: | Redundancy |
| 0010b: | Dependency/no change to packet priority on loss in base queue |
| 0011b: | Dependency/decrease packet priority on loss in base queue |
| 0110b: | Dependency/increase packet priority on loss in base queue |
| 1110b: | Dependency/drop on loss or drop in base queue. |

After determination of the priority level for particular media frames, the subset of network packets associated with each particular media frame are assigned this priority level, where the priority level may be stored in the network packet header.

Furthermore, based on the media frame type, storage time analysis logic 280 may determine the maximum time allowed for the network packets associated with the particular media frame type (Max_Time_In_Queue). For instance, the maximum time period allowed for a network packet associated with an I-frame to reside within a queue awaiting transmission may be based on a group of pictures (GOP) length (e.g., time duration between adjacent I-frames). Similarly, the maximum time period allowed for a network packet associated with a P-frame or B-frame may be considerably less (e.g., the inter-frame rate) while the maximum time period allowed for an audio packet may be based on the sampling rate.

In accordance with the illustrative embodiment described above, priority determination logic 125 produces configuration information 290 (e.g., Presentation_ID; Queue_Num; Total_Bandwidth; Queue_ID; and/or Queue_Bandwidth) that provides relationship information needed by the resource management logic 160 to organize the transmit queue configuration for the presentation. The configuration information 290 may be provided to the resource management logic 160 as part of the network packets (e.g. within headers) or separate from the network packets. Additionally, the priority determination logic 125 produces additional packet header information 295 (e.g., priority level; Max_Time_In_Queue; Start_Media tag; Redundancy/Dependency tags) that may be added within the header portions of the network packets in order to provide relationship information needed by the resource management logic 160 for placement of these network packets into appropriate transmit queues.

Furthermore, in accordance with the illustrative embodiment described above, media frames forming a media stream may be examined to determine their types (e.g., audio, I-frame, B-frame, P-frame, etc.) or proximity of the frame to its neighboring frame (e.g., I-frame). Thereafter, the network packets corresponding to these media frames may be assigned the same priority level. However, as described below, the "realized" priority levels associated with the network packets stored within queues awaiting transmission may be altered in real-time based on feedback information received by the network device 110 and perhaps state information.

Also, it is contemplated that the priority of successive network packets may diminish over time. One reason is that some network packets, while awaiting transmission, may now have substantially less or no value over time. For instance, as an illustrative example, a first subset of network packets that are dependent on a second subset of network packets may have no value if the second subset of network packets is lost in transmission. Hence, the priority level associated with the first subset of packets may be set to the lowest priority level. Conversely, a first subset of network packets that provide redundancy for the second subset of network packets may now be altered with a higher priority level if the second subset of network packets is dropped. In some cases, the priority level may be set as one of a range of values (e.g., 0-10), which are used in combination with other factors such as network conditions to determine whether to transmit or drop that packet. For instance, these network conditions may be determined based on IEEE 802.11 ACK (Acknowledgement) frames received in response to transmitting a portion of a plurality of packets associated with a media stream.

As described for illustrative purposes, the priority level for network packets may be determined based on a priority associated with the media frame. Alternatively, the priority level for non-transmitted packets in a particular subset of frames may be assigned and subsequently altered based on whether certain transmitted packets have successfully reached a target device, or based on a time or time period associated with this particular subset of network packets.

While priority determination logic 125 is described as being implemented within media source 120, it is contemplated that this categorization may be conducted along first communication path 130. For instance, as an optional embodiment as represented by dashed lines, the controller 145 may be positioned along the first communication path 130 between the media source 120 and the network device 110. In such a deployment, the controller 145 may be implemented with the priority determination logic 125, as denoted by the dashed lines as an optional implementation, where the controller 145 would be responsible for re-packetizing content from one or more media streams forming a presentation into network packets assigned priority levels that may be detected and utilized by resource management logic 160 within the network device 110.

Furthermore, as another optional embodiment as represented by dashed lines, the priority determination logic may be implemented within the network device 110, where the network device 110 determines and assigns priority to the network packets as described above prior to operations being conducted by resource management logic 160.

B. Packet Transmission Control

Referring back to FIG. 1, the network device 110 comprises resource management logic 160 that is configured to examine a sequence of network packets, which may include prioritized network packets $170_1$-$170_M$ (e.g., M≥2) being part of a media frame 180, where the media frame 180 is part of a media stream at least partially forming the presentation 105.

According to one embodiment of the disclosure, the resource management logic 160 translates information within the network packets to generate data structures (e.g. transmit queues) that (i) are organized, taking into account the priorities of and the relationships (dependency, redundancy) between network packets, for the presentation being transmitted over the network 100 and (ii) interface with transmission management logic 330 (shown in FIGS. 3-4) to optimize airtime or quality of experience by controlling network packet transmissions.

For instance, network packet transmissions can be controlled by selecting to transmit or drop particular network packet(s) in real-time based at least on the priority level assigned to that particular network packet(s) in light of network conditions and the current state of the network device 110. This enables the network device 110 to perform prioritized network packet dropping or transmissions, where specific network packets within a media stream transmission may be intentionally dropped to optimize system performance, especially where wireless bandwidth constraints are being approached and decode errors are increasing.

Network packet transmissions also can be controlled through dynamic modification of one or more transmission (TX) parameters (a data transmission rate, inter-frame spacing, a number of retries, coding scheme, and/or transmit power level). The TX parameters are adapted to control transmission of network packets from the network device 110 as multicast transmission to a particular group of client devices (e.g., clients $140_1$-$140_3$) or as unicast transmissions directed to a particular client device (e.g. client device $140_1$). The TX parameters may be modified based at least on (i) the classification associated with the particular packet (e.g., priority level), and/or (ii) one or more network conditions (e.g., network load, error rate, amount of allocated time remaining for transmission, etc.). Dynamic modification of the transmission parameters is designed to improve the chances of successful reception and decode of certain packets (e.g., increase power level on a per packet basis, decrease the coding rate, increase the number of retransmissions, etc.) or reduce wireless traffic (e.g., decrease the number of re-transmissions, increase the coding rate, etc.).

Herein, as shown in FIG. 1, resource management logic 160 obtains feedback information 190 associated with network conditions via a communication interface 115. For instance, feedback information 190 may include an ACK (Acknowledgement) packet in accordance with any IEEE 802.11 standard (e.g., IEEE 802.11g, IEEE 802.11n, IEEE 802.11ac, etc.), where the lack of an ACK packet may identify a failure in transmission of network packets associated with a portion of a media stream. Of course, receipt of multicast packets is not acknowledged without special intervention so that redundant queues may be set to the highest priority for multicast media streams.

Resource management logic 160 also may be configured to receive information 192 that is used to maintain the state of network device 110. For instance, as shown for illustrative purposes, resource management logic 160 may receive state information 192 from one or more sources such as controller 145 and/or client devices $140_1$-$140_N$. Examples of state information may include bandwidth contract information that identifies minimum and/or maximum bandwidth requirements for client devices $140_1$-$140_N$, transmit power levels utilized by client devices $140_1$-$140_N$, client association information, or transmission rates used in communications by network device 110 to each of the associated client device $140_1$-$140_N$.

It is noted that the feedback information 190 and/or the state information 192 may be used to dynamically modify transmission parameters for the network device, but also may be used to (i) modify priority levels associated with the transmit queues and/or network packets along with subsequent decisions and/or (ii) determine whether to transmit/drop particular network packets in accordance with available airtime.

Figure 3:
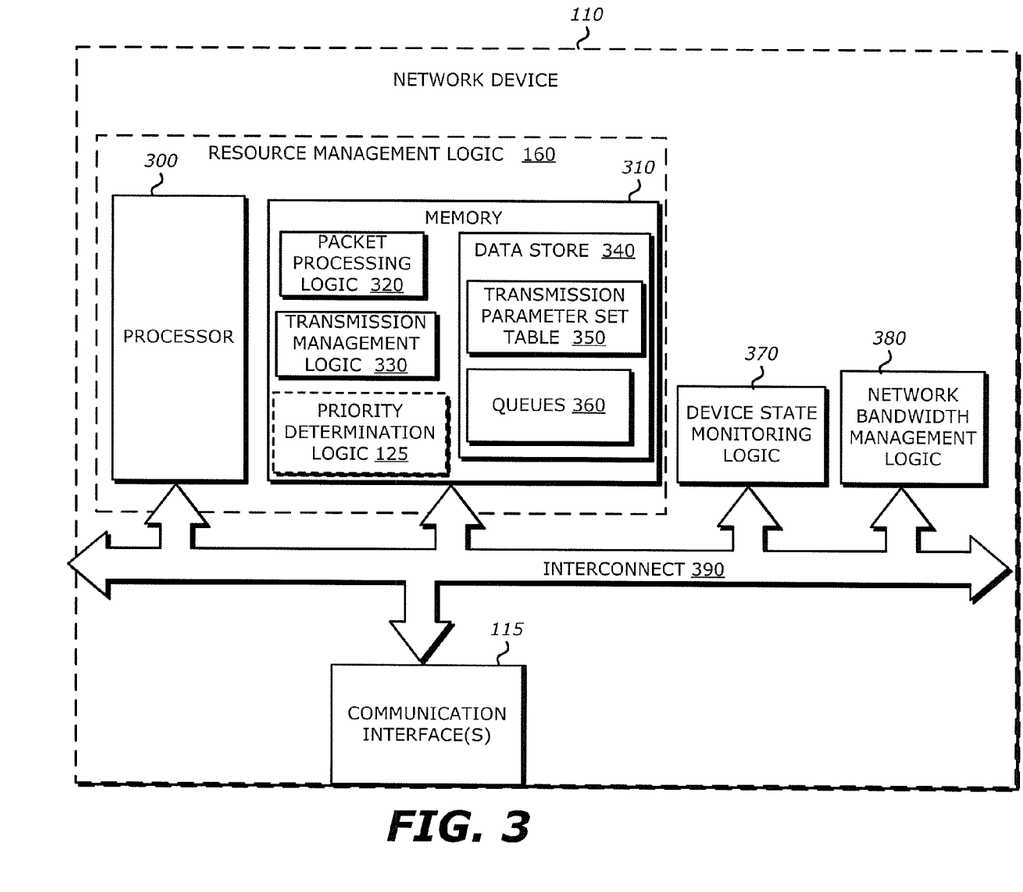
FIG. 3 is an illustrative embodiment of a network device implemented with the resource management logic of FIG. 1.

Referring now to FIG. 3, an illustrative embodiment of network device 110 operating in combination with the media source 120 is shown. In accordance with one embodiment of the disclosure, resource management logic 160 within network device 110 comprises a processing circuitry 300, a memory 310 and/or one or more communication interfaces 115 that is(are) adapted to communicate with other network devices supporting wired and/or wireless connectivity. These components are coupled together by an interconnect 390. As shown, communication interface(s) 115 may comprise a wired port and/or one or more radios, tuners, and/or antenna(s) that support wireless communications.

According to one embodiment of the disclosure, memory 310 may be a type of non-volatile memory that is adapted to store software modules that are responsible for controlling network packet transmissions. As shown, the software modules may include packet processing logic 320 and transmission management logic 330.

Packet processing logic 320 is configured to extract incoming prioritized network packets for a presentation being wirelessly transmitted, organize a plurality of transmit queues 360 for use in temporarily storing the prioritized network packets prior to transmission, and route network packets associated with different media streams into their corresponding queues 360. According to one embodiment of the disclosure, the queues 360 are organized based on the priorities of and the relationships (dependency, redundancy) between media streams forming the presentation that is being transmitted over the network. The relationships between media streams forming the presentation are determined by the priority determination logic 125, where configuration information 290 associated with the relationships may be forwarded by the priority determination logic 125 in-line as information contained within headers of the network packets to packet processing logic 320 or separately from the network packets.

Herein, the queues 360 are accessible by the transmission management logic 330, which controls network packet transmissions in order to optimize airtime. Based on the current state of the network device 110 maintained by device state monitoring logic 370 and network conditions maintained by network bandwidth management logic 380 accessible via interconnect 390, transmission management logic 330 accesses a transmission parameter set table 350 within data store 340 in order to determine, for an incoming packet, any modifications that should be made to TX parameters (e.g., data transmission rate, inter-frame spacing, a number of retries, coding scheme, and/or transmit power level) for a particular priority.

As an illustrative example, transmission management logic 330 analyzes, in a periodic or aperiodic manner, the feedback and state information. Upon determining certain conditions that may cause insufficient airtime for transmitting all of the network packets for the presentation that are currently awaiting transmission (e.g., higher transmission errors, increased load, etc.), the transmission management logic 330 may access a different entry within the transmission parameter set table 350 in order to use one or more different TX parameters. Such modification may involve dropping network packets having less than or equal to a third priority, which may include network packets from an entire queue as well as network packets from higher priority queues. Alternatively, the modification may involve a scaled reduction of TX rates for network packets from each of the queues 360, where network packets from a queue having a first priority (P1) may be transmitted at a 9 megabits per second (9 Mbps) while network packets from a queue having a second priority (P2, where P1>P2) and network packets from a queue having a third priority (P3, where P2>P3) may be transmitted at 12 Mbps and 18 Mbps, respectively.

In general, based on real-time feedback and state information, transmission management logic 330 may adjust TX rates and/or number of retries for network packets maintained within various queues. Such adjustments may be scaled so that the TX rates for the queues are altered (upward or downward) while relative differences in data transmission rates associated with some or all of the queues are maintained. Alternatively, such adjustment may be conducted on a queue-by-queue basis (e.g., by hierarchy in which a base queue is assigned a lower transmission rate than originally assigned while a dependent queue is assigned a higher transmission rate than originally assigned; number of retries for network packets from the base queue is increased while the number of retries for network packets from the dependent queues is reduced).

It is contemplated that multiple presentations may be handled concurrently (i.e. at least partially overlapping in time), where each presentation is associated with a particular priority. Where the priority of the presentation is reduced/increased, it is noted that a corresponding priority reduction/increase may be realized for each queue associated with the presentation and for each network packet maintained within each queue. The same principles apply to increases/decreases in priority for the queues, such as increases/decreases may also increase/decrease the assigned priority for the network packet.

Figure 4:
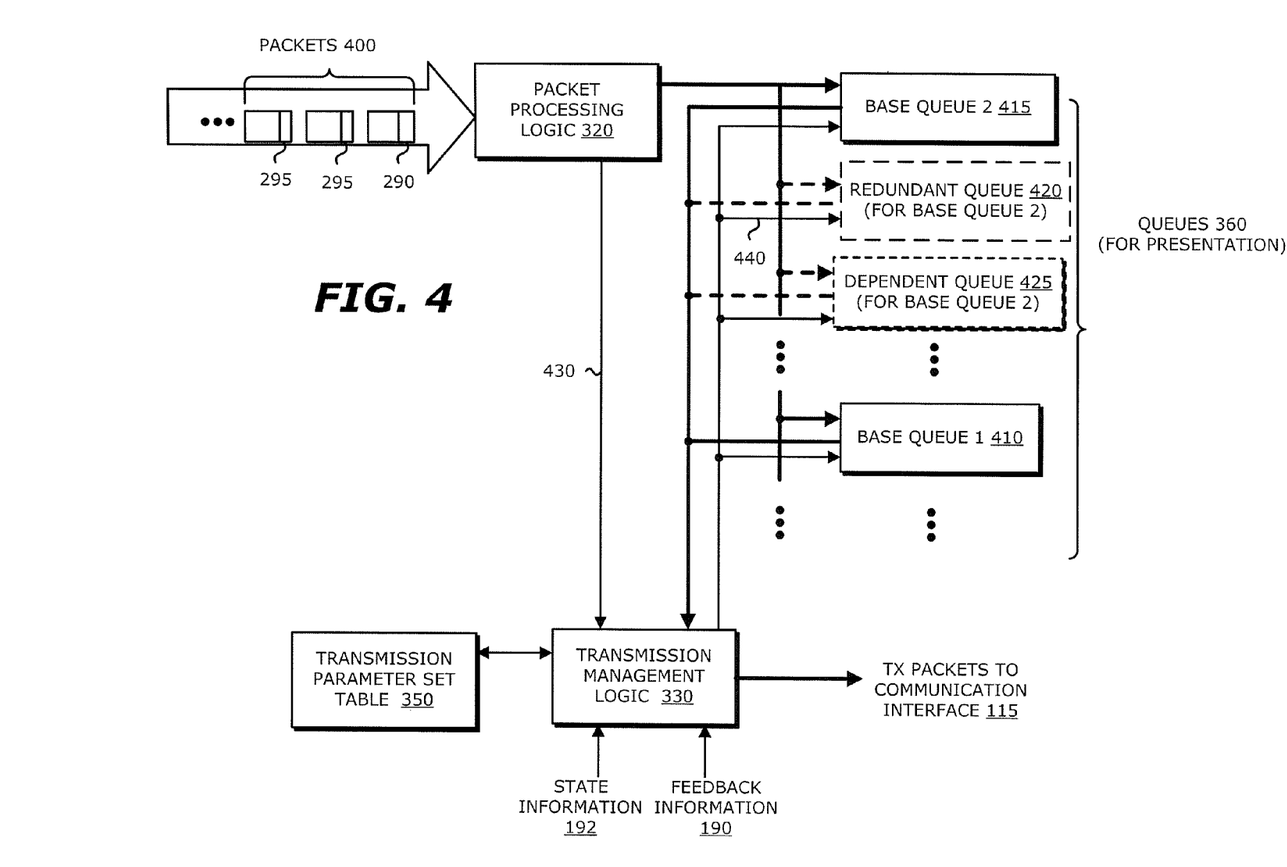
FIG. 4 is an illustrative embodiment of the logic and functionality provided by the resource management logic of FIGS. 1 and 3.

Referring now to FIG. 4, an illustrative embodiment of the logic and functionality provided by the resource management logic 160 of FIGS. 1 and 3 is shown. Herein, the resource management logic 160 feature the functionality associated with packet processing logic 320, transmission management logic 330, transmission parameter set table 350 and queues 360.

Herein, packet processing logic 320 receives a sequence of packets 400, where some or all of packets 400 may be associated with a presentation. Packet processing logic 320 is configured to identify network packets that have been assigned priority in accordance with the network packet prioritization scheme described above. This may be accomplished, for example, through analysis of the packet headers and detecting a priority level within a particular field within these headers.

Packet processing logic 320 is further configured to organize (e.g. construct) queues 360 for handling transmission of prioritized network packets forming the presentation. According to one embodiment of the disclosure, the packet processing logic 320 is adapted to receive configuration information 290 produced by the priority determination logic 125 of FIG. 2 in order to establish a queue configuration for the presentation. Examples of the configuration information 290 include, but are not limited or restricted to the following:

Presentation_ID—a unique identifier for each incoming presentation;

Queue_Num—number of queues for a particular presentation;

Total_Bandwidth—total amount of bandwidth required to transmit all of the network packets forming the presentation;

Queue_ID—a unique identifier for each media stream; for use in identifying a particular queue to which the network packet may be forwarded; and Queue_Bandwidth—the bandwidth necessary to deliver all of the data associated with the queue successfully.

According to one embodiment of the disclosure, configuration information 290 may be provided within a header of certain packets such as the start of a media frame (e.g., identified by presence of Start_Media tag), header within all prioritized network packets, initial set-up packet(s) separate from the prioritized network packets, or in accordance with Session Description Protocol (SDP).

Herein, as shown, queues 360 are organized based on the priorities of and the relationships (dependency, redundancy) between media streams forming the presentation that is being transmitted over the network. The relationships between media streams forming the presentation are determined by the priority determination logic 125, where information associated with the relationships may be part of configuration information 290 (Queue_ID, Queue_Bandwidth). All queues for a presentation may be adapted to start with the same priority, and based on network conditions, one or more dependent queues may be reduced to a lower priority (less robust, less air-time) transmission set, before base queues.

Figure 5A:
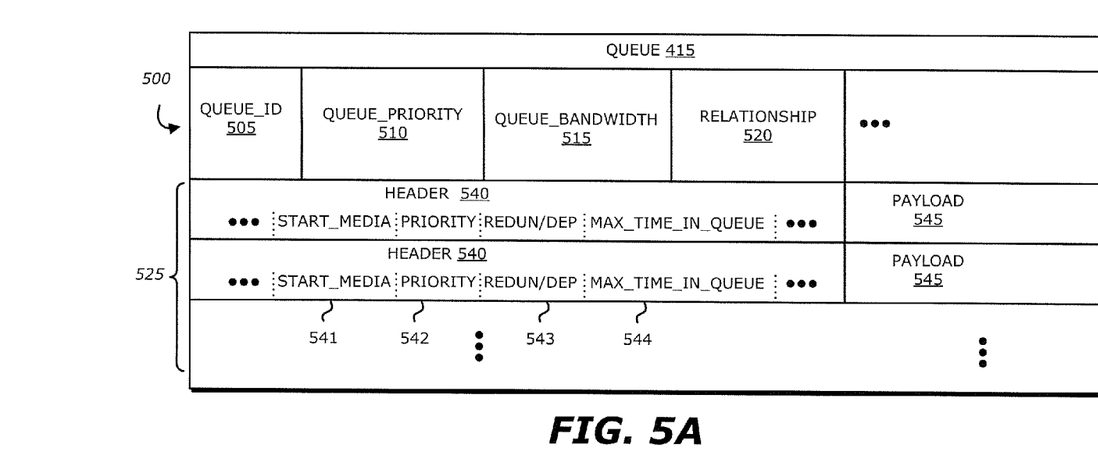
FIG. 5A is an exemplary block diagram illustrating a logical construct of a queue construct for transmit queues accessible by logic within the resource management logic of FIG. 1.

As shown in FIG. 5A, an exemplary block diagram illustrating a logical construct of one of the queues 360 (e.g. queue 415) is shown. Queue 415 includes configuration information 500 and a plurality of entries 525 for storage of the prioritized network packets. The configuration information 500 identifies the queue and characteristics of the queue 415. For instance, the configuration information 500 may include Queue_ID 505 that uniquely identifies the queue 415 (and the media stream associated with the queue 415); queue priority 510 that identifies the priority of the queue 415 to at least partially assist the transmission management logic 330 in real-time control of packet transmission or dropping; queue bandwidth 515 (Queue_Bandwidth) that represents the bandwidth needed to deliver all of the data associated with the queue (e.g., data associated with the corresponding media frame); and/or relationship 520 that identifies whether the queue 415 operates as a redundant queue, dependent queue or a "base" queue (no dependency and redundancy with other queues).

As described above and illustrated in FIG. 2, each network packet may be extended to include priority level and other parameters for use in real-time control of packet transmissions. Each entry 530 of queue 415 is configured to store a particular network packet including its header 540 and payload 545. As an example, the header 540 may include (1) Start-Media tag 541; (2) priority level 542; relationship (redundant/dependent) 543; maximum time allowed in queue without transmission (Max_Time_In_Queue) 544, as described above.

As an illustrative example, an incoming presentation comprises multiple media streams including a first stream that includes audio, a second stream that includes base layer video, a third stream that includes resolution enhancement layer video, and a fourth stream with FEC data for the base layer video. Hence, the configuration of queues 360 for supporting the exemplary presentation may feature a first (base) queue 410 for processing of audio network packets and a second (base) queue 415 for processing of network packets associated with the base layer video. These "base" queues 410 and 415 are not dependent on any other queues, and are assigned a first priority.

As further shown, a third (redundant) queue 420 is configured by packet processing logic 320 with a priority level that is initially lower than the priority level assigned to the second (base) queue 415. The lower priority level is due, at least in part, to its redundant relationship with second (base) queue 415. However, the priority for the third (redundant) queue 420 varies in real-time based on the feedback information 190 received by transmission management logic 330 and the queue to which the third queue 420 is redundant. For instance, in response to a feedback event 440 triggered upon unsuccessful transmission of the network packets to which the redundant network packets pertain, the priority assigned to the third (redundant) queue is increased, perhaps even higher than the second (base) queue 415.

Finally, as shown, a fourth (dependent) queue 425 is provided for network packets associated with resolution enhancement layer video, as these packets are dependent on the video network packets stored in the second (base) queue 415. The fourth (dependent) queue 425 would be associated with a priority less than the second (base) queue 415 at least in part due to the dependency relationship.

As packet processing logic 320 populates queues 360, configuration information 440 is also provided to transmission management logic 330. As a result, transmission management logic 330 is aware of the queue configuration for every presentation, including (1) total bandwidth needed by the presentation (Total_Bandwidth, Presentation_ID); (2) the number of queues (Queue_Num); (3) bandwidth associated with each of the queue 410-425 (Queue_Bandwidth); (4) priorities associated with each queue 410-425; and/or (5) memory locations where the queues 410-425 reside.

Figure 5B:
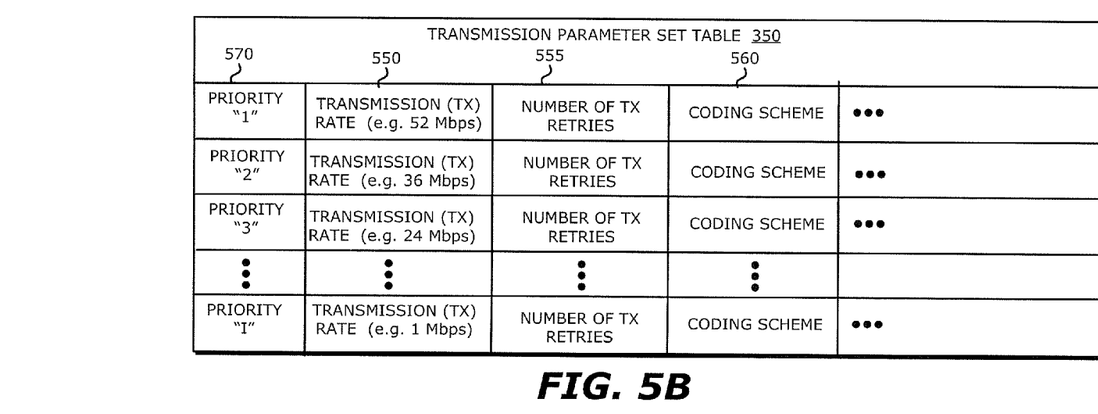
FIG. 5B is an exemplary block diagram illustrating a logical construct of a transmission parameter set table accessible by logic within the resource management logic of FIG. 1.

In real-time, transmission management logic 330 analyzes feedback information 190 and state information 192. Upon determining certain conditions that may cause insufficient airtime for transmitting the network packets within queues 410-425 that are currently awaiting transmission, the transmission management logic 330 accesses different entries of the transmission parameter set table 350 of FIG. 5B in order to alter its transmission parameters (e.g. TX rate 550, number of retries 555, and/or coding scheme 560) based on different queue priorities 570.

For instance, where the network conditions are such that the transmission rate for high priority network packets (e.g. audio packets, I-frame video packets, etc.) are experiencing transmission difficulties at a prescribed TX rate, the transmission management logic 330 is able to perform any number of dynamic modifications to the TX parameters and/or drop certain network packets residing in the queues

410-425. As an example, the transmission management logic 330 may (i) drop some or all of the network packets stored in third (redundant) queue 420 and fourth (dependent) queue 425, as these queues are directed to media streams of lesser priority than the base layer video and audio; (ii) drop certain network packets within the first and second (base) queues 410 and 415 that may have a lesser priority than other network packets within the third (redundant) queue 420 and fourth (dependent) queue 425; (iii) alter TX rate for network packets associated with the first and second (base) queues 410 and 415 to ensure successful delivery, with intentionally dropping of certain network packets as the TX rate modification effectively reduces the amount of airtime available for transmission of the remaining network packets; and/or (iv) alter the number of retries provided the error rate is maintained at an acceptable level.

In general, based on real-time feedback and state information, transmission management logic 330 may drop network packets based on priority, drop network packets based on queue priority, adjust TX rates, adjust the number of retries for network packets maintained within various queues, changing coding scheme, or any combination thereof. Such adjustments may be scaled between queues or adjustments may be concentrated to particular queue.

Although not shown, it is contemplated that multiple presentations may be handled concurrently. The transmission management logic 330 would be configured to manage the transmission of network packets associated with each presentation based on the same state information but different feedback information that denote the network conditions for transmission of the network packets associated with the presentation.

III. Illustrative Procedures Conducted by the Resource Management Logic

As a recap of the above described operations, the following paragraphs outline exemplary functionality that may be supported by the resource management logic 160 in order to provide a queue architecture that supports priority setting of network packets and control transmission of these network packets in efforts to achieve optimal airtime usage. It is contemplated that this functionality is illustrative in nature, as there may be additional rules, besides those outlined herein, to provide network packet prioritization and packet transmission control.

Dropping packets from a queue:
1) Queues are considered for drops starting at the lowest priority level (most dependent) to the highest priority level (base queues)
2) Packets are transmitted or dropped (and thus removed) from the head of a queue by use of the Start_Media tags, where a media frame contains a single picture or related audio samples). If part of the media frame has been transmitted, then its transmission should be completed. In order to follow this rule a counter for Start_Media tags within the queue can be maintained. The queue is not eligible for drops if there are not at least two Start_Media tags (the queue with less than two Start_Media tags is in the middle of transmitting a media frame or it is empty).
3) A packet is eligible for drop if its estimated time in queue is greater than its Max_Time_In_Queue parameter.
4) If a packet is chosen for drop then all packets in that media frame are dropped (drop until the next Start_Media tag).
5) The packets are considered in order from the head of the queue to the tail.
6) Packets are skipped in the queue until the first packet with a Start_Media tag is found.
7) Packets are then considered for drop until either:
   a) There are no packets eligible for drop, or
   b) There is <=1 Start_Media tag in the queue.

Queue Priorities:
1) Each queue in a presentation has a priority within that presentation defined by its level in the dependency and redundancy hierarchy.
2) A dependent queue has a lower priority than the queue that it is dependent upon.
3) All base level queues are assumed to have the same priority.
4) A selected queue, such as one of the base queues, may be selected as a default queue.
5) A redundancy queue has the lowest priority unless a feedback event is triggered upon detection by the packets to which the redundant packets are provided were not successfully transmitted. Thereafter, the redundancy queue may be assigned a priority higher than the queue that it has a redundancy for.

Queue Airtime:
1) Airtime for a presentation should be allocated by priority for each queue. A queue should have greater than or equal airtime allocated to any lower priority queue.
2) Each queue should have a queue transmission parameter-set index that indicates a set of adjustment factors to rates and retries that were determined for the network device and client device, or for the group in the case of pure multicast.
3) Assuming that there is enough bandwidth available for the entire presentation, all queues may start with the same queue transmission parameter-set index base of 0.
4) A queue's airtime may be manipulated by changing its queue transmission parameter-set index base.
5) A queue's current transmission parameter-set index is generated by adding its index base to the highest index base of any queues that it has a dependency on.
6) Within a queue, each packet has a priority assigned to it. Higher priority packets should be allocated more airtime. It is assumed that this allocation will prioritize increased retries (when available given the current queue transmission parameter-set), followed by more robust modulation (slower rates). Pure multicast does not allow for retries (the transmission parameter-set should reflect this) and therefore higher priority packets should be sent at slower rates.

Packet input to Presentation:
1) If the network packet has a specific QueueID, then that queue is chosen. Otherwise, the network packet is placed in a default queue. The default queue may be set to be a base queue (no dependencies or redundancies).
2) If there are no resources left to successfully queue the packet, then follow the drop procedure above for all queues with a lower or equal priority to the queue targeted by the packet's QueueID (inclusive of the targeted queue) and try to queue again.
3) If the estimated time in queue for this packet is greater than its Max_Time_In_Queue (but the delta is not more than a prescribed DropThreshold) then reduce airtime by increasing the queue transmission parameter-set index base and set the queue's debounce counter to its max level.
4) If the delta is greater than or equal to DropThreshold then follow the drop procedure above for all queues with a lower or equal priority to the queue targeted by the packet's QueueID (inclusive of the targeted queue) and queue the packet.

Packet Transmissions:
1) The Queues are serviced in order of dependencies. Queues with no dependencies on other queues (base queues) are higher in priority.
2) A redundancy queue will have a higher or lower priority based on the feedback in its base queue.
3) Packets within a queue are typically sent in order.
4) Packets in separate queues may be sent independently, but with the goal to transmit the packet within the specified time.
5) Recovery of rates: (i) the queue transmission parameter-set index base is brought back to 0 for each queue in order of highest priority (base queue with no dependency) to lowest priority (highest dependency level), if (ii) the estimated time in queue for the last packet in the lowest priority queue in the presentation is less than its Max_Time_In_Queue.

Estimated Time in Queue:
1) The estimated time in queue for a packet p is a value at any given instant that should account for:
   a) the current airtime available for transmission to the target client device,
   b) the transmission time of the packets (size and number) that proceed p in its queue and all higher priority (lower level) queues may be calculated using:
      i) the current rate of transmission to the target client device,
      ii) the current packet error rate to the target client device,
      iii) the current modifications to the transmission parameters indicated by the queue parameter-set index base, and
   c) the number of queues at the same level as p.

The queue transmission parameter-set index base:
1) A transmission parameter-set is a set of modifications that should be made to the transmission parameters (e.g., rates, retries, etc.) for each priority.
2) It is anticipated that these modifications will be kept within the transmission parameter set table.
3) The proposed approach allows the APs the flexibility to determine these tables based on radios, configuration, current environment, and any other input deemed appropriate.
4) It is anticipated that some entries in transmission parameter set table will indicate that the packet should be dropped.

Packet priority:
1) A packet that has a dependency on its own queue may, in certain cases, adjust its "realized priority" based on a change in the queue and its corresponding priority tag.
2) A queue that has a priority dependency on another queue may, in certain cases, adjust the priority of all of its packets in response to a change in priority of the queue to which it depends.

IV. Priority Level Determination and Packet Transmit/Drop

Figure 6A:
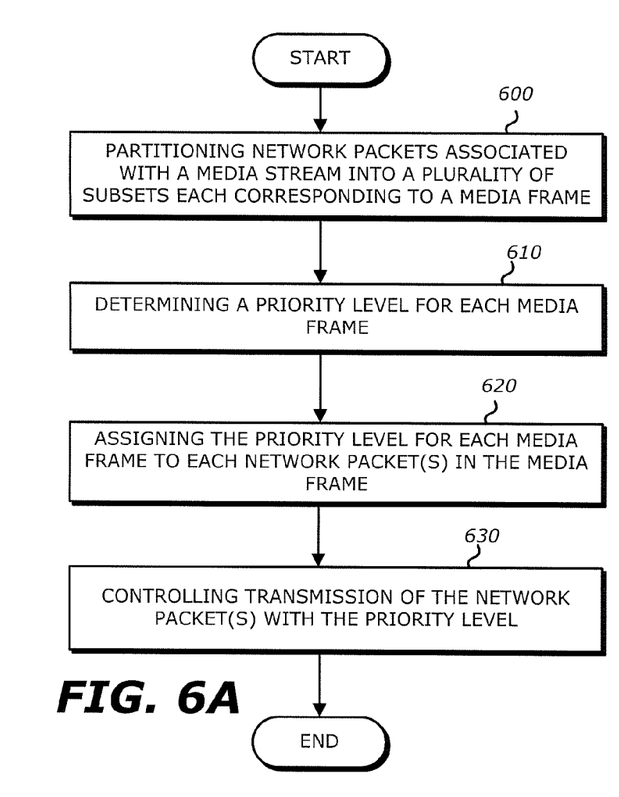
FIG. 6A is an illustrative flowchart of a method performed by a network device for determining priority levels for network packets and controlling transmission of the network packet with the priority level.

Referring to FIG. 6A, an illustrative flowchart of a method performed by a network device for determining priority levels for network packets and controlling transmission of the network packet with the priority level. Such operations may be performed by any network device including a media source, AP, controller or the like. Initially, network packets associated with a media stream are partitioned into a plurality of subsets, where each subset of network packets corresponds to a media frame (block 600). This partitioning may be conducted to correspond to an encoded picture such as an I-frame, P-frame, B-frame or the like. As a result, the media stream has been partitioned to comprise a plurality of media frames. Thereafter, a priority level for each particular media frame of the plurality of media frames is determined (block 610).

According to one embodiment of the disclosure, the priority level for each particular media frame may be determined based at least on a media frame type (e.g. an I-frame, B-frame, or P-frame). According to other embodiments of the disclosure, the priority level for each particular media frame may be determined based at least on (1) a distance of the particular media frame from the following I-frame or a previous I-frame in the media stream; (2) a presentation to which the particular media frame belongs and/or the bandwidth associated with the presentation; (3) a time or time period associated with the particular subset of media frames, where priority may be reduced if dependent media frames have already been transmitted for display; (4) whether or not there are other media frames, in the plurality of media frames, that duplicate the data in the particular media frame; and/or (5) whether or not there are other media frames, in the plurality of media frames, such that the proper decoding of information contained within them may depend on the data in the particular media frame.

Thereafter, the priority level for each particular media frame is assigned to each of the one or more network packets in the particular media frame (block 620). Thereafter, the network device may be configured to transmit each of the plurality of network packets with the priority level for each of the plurality of network packets (block 630). This assignment of priority to each network packet of within a media stream enables some network packets to be intentionally dropped to optimize system performance when wireless bandwidth constraints are being approached.

Figure 6B:
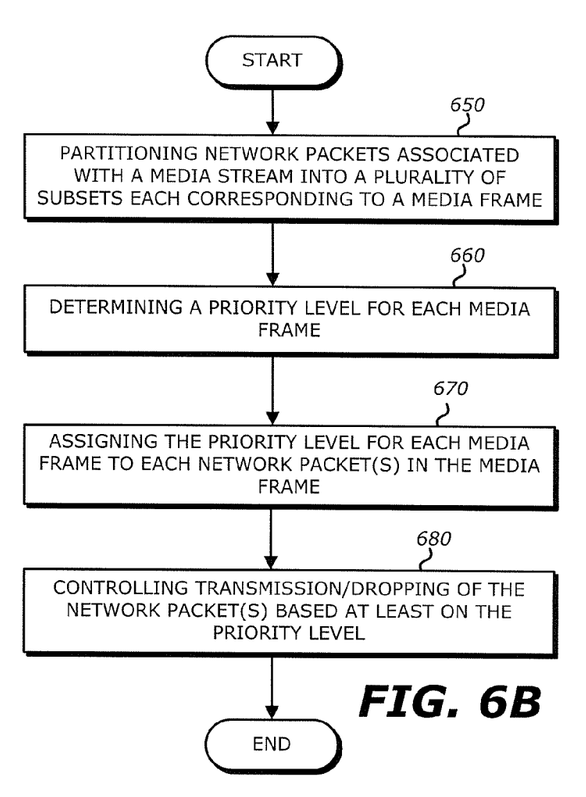
FIG. 6B is an illustrative flowchart of a method performed by a network device for determining priority levels for network packets and transmitting or dropping each network packet based at least on its priority level.

Referring now to FIG. 6B, an illustrative flowchart of a method performed by a network device for determining priority levels for network packets and transmitting or dropping each network packet based at least on its priority level is shown. Herein, as described above, network packets associated with a media stream are partitioned into a plurality of subsets, where each subset of network packets corresponds to a media frame (block 650). This partitioning may be conducted to correspond to an encoded picture such as an I-frame, P-frame, B-frame or the like. Thereafter, a priority level for each particular media frame of the plurality of media frames is determined (block 660).

When the priority level has been determined for a particular media frame, the priority level for that particular media frame is assigned to each of the one or more network packets in that particular media frame (block 670). Thereafter, the network device may be configured to transmit or drop network packets based at least on the priority level (block 670). According to one embodiment, the transmission or dropping of the network packets may be further based on one or more network conditions that are determined. One of these network conditions may be whether or not IEEE 802.11 ACK packets are received in response to transmitting a portion of the plurality of network packets.

V. Dynamic TX Parameter Modification

Figure 7:
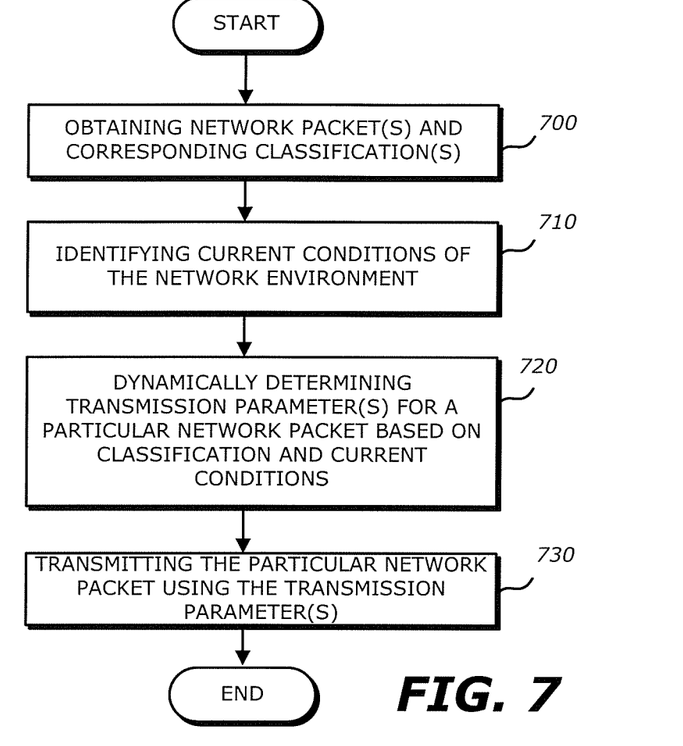
FIG. 7 is an illustrative flowchart of a method performed by a network device for dynamically adjusting transmission parameters based on packet priority and network conditions.

Referring to FIG. 7, an illustrative flowchart of a method performed by a network device for dynamically adjusting transmission parameters based on packet priority and network conditions is shown. Herein, a plurality of network packets and a corresponding classification associated with each of the plurality of network packets is obtained (block 700). The classification may include the priority level assigned to the particular network packet. It is noted that, according to one embodiment of the disclosure, network packets corresponding to the same media frame are classified identically. Thereafter, one or more current network conditions are identified by the network device (block 710).

According to one embodiment of the disclosure, the one or more current network conditions may be directed to an amount of time left for transmitting the plurality of network packets. According to other embodiments of the disclosure, the one or more current conditions may indicate (1) a level of congestion of a network on which the plurality of network packets are to be transmitted; (2) an error rate associated with transmitted network packets of the plurality of network packets; (3) that a device is to be removed from a network on which the plurality of network packets are to be transmitted (e.g., forced roam expected; network conditions expected to get better); and/or (4) a level of congestion is expected to increase or decrease or that a load at a particular device is expected to increase or decrease.

Thereafter, for each particular network packet of the plurality of network packets, the network device dynamically determines one or more transmission parameters for transmitting the particular network packet based on (a) the classification associated with the particular network packet and (b) the one or more current conditions (block 720). According to one embodiment of the disclosure, the transmission parameter(s) may include a transmission data rate. According to other embodiments of the disclosure, the transmission parameter(s) may include (i) one or more of: Arbitration Inter-Frame Spacing (AIFS), Minimum Contention Window, Maximum Contention Window, or Maximum Burst Size; (ii) a number of retries for transmitting the particular network packet; (iii) a transmission power for transmitting the particular network packet; and/or (iv) a coding scheme.

Thereafter, the network device transmits the particular network packet using the one or more transmission parameters (block 730).

Additional advantages and modifications will be clear to those skilled in the art. Embodiments are not limited to the specific details and representative examples shown and described herein. Various modifications may be made without departing from the spirit or scope of the embodiments as determined by the subsequently filed claims and their equivalents. The descriptions are thus to be regarded as illustrative instead of limiting.

What is claimed is:

1. A non-transitory computer-readable storage medium comprising instructions which, when executed by one or more hardware processors of a network device, cause the one or more hardware processors to:
   partition a plurality of network packets associated with a media stream into a plurality of subsets, each subset from the plurality of subsets corresponding to a media frame from a plurality of media frames;
   determine a priority level for the media frame from the plurality of media frames;
   assign the priority level to a subset of network packets corresponding to the media frame based on the priority level of the media frame;
   modify one or more transmission parameters for each network packet of the plurality of network packets based on the priority level assigned to the network packet; and
   transmit or drop network packets of the plurality of network packets using the modified one or more transmission parameters.

2. The non-transitory computer-readable storage medium of claim 1, wherein the instructions are further to cause the one or more hardware processors to:
   identify a subset of media frames in the plurality of media frames based on each media frame of the subset of media frames corresponding to one encoded picture, wherein the priority level for non-transmitted network packets in the subset of media frames is assigned based at least on whether the transmitted network packets in the subset of media frames successfully reached a target device.

3. The non-transitory computer-readable storage medium of claim 1, wherein the priority level for the media frame is determined based at least on a media frame type comprising one of: I-frame, B-frame, or P-frame.

4. The non-transitory computer-readable storage medium of claim 1, wherein the priority level for the media frame is determined based at least on a distance of the media frame from the following I-frame or a previous I-frame.

5. The non-transitory computer-readable storage medium of claim 1, wherein the one or more hardware processors are to base a determination to transmit or drop the network packets on one or more network conditions that are determined based on 802.11 ACK packets received in response to transmitting a portion of the plurality of network packets.

6. The non-transitory computer-readable storage medium of claim 1, wherein the instructions are further to cause the one or more hardware processors to:
   identify a subset of media frames in the plurality of media frames based on each media frame of the subset of media frames corresponding to one encoded picture, wherein the priority level for network packets in the subset of media frames is based at least on a time or time period associated with the subset of media frames.

7. The non-transitory computer-readable storage medium of claim 1, wherein to determine the priority level for the media frame, the one or more hardware processors are to base the determination in part on a presentation to which the media frame belongs.

8. The non-transitory computer-readable storage medium of claim 1, wherein to determine the priority level for the media frame, the one or more hardware processors are to base the determination in part on a presentation to which the media frame belongs and a bandwidth associated with the presentation.

9. The non-transitory computer-readable storage medium of claim 1, wherein to determine the priority level for the media frame, the one or more hardware processors are to base the determination in part on a determination as to whether a second media frame, that is redundant to the media frame, successfully reached a target device.

10. The non-transitory computer-readable storage medium of claim 1, wherein the media frame includes one or more network packets each being assigned a priority level.

11. The non-transitory computer-readable storage medium of claim 1, wherein the current network conditions comprise one or more of (1) a level of congestion of a network on which the plurality of network packets are to be transmitted; (2) an error rate associated with transmitted network packets of the plurality of network packets; (3) whether a second network device is to be removed from the network on which the plurality of network packets are to be transmitted; (4) a level of congestion is expected to increase or decrease; or (5) a load at the network device is expected to increase or decrease.

12. A non-transitory computer-readable storage medium comprising instructions which, when executed by one or more hardware processors, cause the one or more hardware processors to:
- partition a plurality of network packets associated with a media stream into a plurality of subsets, each subset in the plurality of subsets corresponding to a media frame from a plurality of media frames;
- determine a priority level for the media frame in the plurality of media frames;
- assign the priority level to a subset of network packets corresponding to the media frame base on the priority level of the media frame;
- modify one or more transmission parameters for each of the plurality of network packets based on the assigned priority level of the network packet; and
- transmit each of the plurality of network packets using the modified one or more transmission parameters.

13. The non-transitory computer-readable storage medium of claim 12, wherein the priority level for the media frame is determined based at least on a media frame type comprising one of: I-frame, B-frame, or P-frame.

14. The non-transitory computer-readable storage medium of claim 12, wherein the priority level for the media frame is determined based at least on a distance of the media frame from the following I-frame or a previous I-frame in the media stream.

15. The non-transitory computer-readable storage medium of claim 12, wherein the instructions are further to cause the one or more hardware processors to:
- identify a subset of media frames in the plurality of media frames based on each media frame of the subset of media frames corresponding to one encoded picture, wherein the priority level for network packets in the subset of media frames is based at least on a time or time period associated with the subset of media frames.

16. The non-transitory computer-readable storage medium of claim 12, wherein to determine the priority level for the media frame, the one or more hardware processors are to base the determination in part on a presentation to which the media frame belongs.

17. The non-transitory computer-readable storage medium of claim 12, wherein to determine the priority level for the media frame, the one or more hardware processors are to base the determination in part on a presentation to which the media frame belongs and a bandwidth associated with the presentation.

18. The non-transitory computer-readable storage medium of claim 12, wherein to determine the priority level for the media frame, the one or more hardware processors are to base the determination on whether or not there are other media frames in the plurality of media frames that duplicate the data in the particular media frame.

19. The non-transitory computer-readable storage medium of claim 12, wherein the media frame includes one or more network packets each being assigned a priority level.

* * * * *